United States Patent Office 2,989,560
Patented June 20, 1961

---

2,989,560
ADDITION OF HALOFORMS TO UNSATURATED SILOXANES
James G. Marsden, Tonawanda, N.Y., assignor to Union Carbide Corporation, a corporation of New York
No Drawing. Filed June 27, 1958, Ser. No. 744,904
5 Claims. (Cl. 260—448.2)

This invention relates to novel organo-functional silicon compounds, and to processes for their production. More particularly, this invention is concerned with novel organo-functional silicon compounds produced by the addition of a haloform to a siloxane containing at least one olefinically unsaturated hydrocarbon radical, and to processes for their production.

The preparation of silicon compounds having both organo-functional and silicon-functional groups is highly desirable since it permits the resulting products to have organic reactivity in addition to silicon reactivity. One method by which it would appear feasible to prepare such compounds would be by the addition of compounds containing a reactive hydrogen atom to unsaturated silanes which contain hydrolyzable groups, as alkoxy or halogen groups, bonded to the silicon atom thereof. Attempts have been made to produce organo-functional silicon compounds by the above method; however, it has been found that the addition reaction will not occur. Thus, attempts to add haloforms to unsaturated hydrolyzable silanes, such as methylvinyldichlorosilane and methylvinyldiethoxysilane, have been unsuccessful. Although haloforms have been successfully added to trialkylvinylsilanes, the resulting silanes are non-functional with respect to silicon, and cannot be used to prepare silicon polymers.

According to the process of this invention, organo-functional siloxanes which contain trihalogenated, saturated hydrocarbon radicals can be produced by forming a mixture of a haloform, a siloxane containing an olefinically unsaturated hydrocarbon radical bonded to at least one silicon atom thereof, and a catalyst, and heating the mixture to a temperature sufficiently elevated to cause said haloform and said siloxane to react to produce said organo-functional siloxanes.

The organo-functional siloxanes produced by the process of this invention contain at least one unit depicted by the formula:

(1) 

wherein R' is a trihalogenated, saturated hydrocarbon radical containing from 3 to 7 carbon atoms, such as trihalopropyl, trihalobutyl, trihaloamyl and the like; R is an alkyl radical, such as methyl, ethyl, propyl and the like, or an aryl radical, such as phenyl, naphthyl, tolyl and the like; and n is an integer having a value of from 0 to 2, inclusive.

More specifically, when the haloform employed as starting material is chloroform, the organo-functional siloxanes produced by the process of this invention contain at least one unit depicted by the formula:

(2) 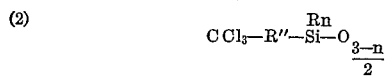

wherein R'' is a divalent saturated hydrocarbon radical containing from 2 to 6 carbon atoms, such as ethylene, propylene, butylene, cyclohexylene and the like; R is an alkyl radical, such as methyl, ethyl, propyl and the like, or an aryl radical, such as phenyl, naphthyl, tolyl and the like; and n is an integer having a value of from 0 to 2, inclusive.

When the haloform employed as starting material is bromoform, the organo-functional siloxanes produced by the process of this invention contain at least one unit depicted by the formula:

(3) 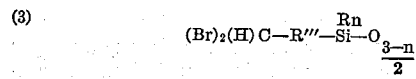

wherein R''' is a mono-brominated divalent saturated hydrocarbon radical containing from 2 to 6 carbon atoms, such as monobromo ethylene, mono-bromo propylene, mono-bromo butylene, mono-bromo cyclohexylene and the like; R is an alkyl radical, such as methyl, ethyl, propyl and the like, or an aryl radical, such as phenyl, naphthyl, tolyl and the like; and n is an integer having a value of from 0 to 2, inclusive.

The organo-functional siloxanes produced by the process of this invention can also contain one or more hydrocarbon-substituted siloxane units depicted by the formula:

(4) 

wherein R is an alkyl radical, such as methyl, ethyl, propyl and the like, or an aryl radical, such as phenyl, naphthyl, tolyl and the like, and a is an integer having a value of from 1 to 3, inclusive.

Thus, the organo-functional siloxanes which can be prepared in accordance with this invention can be composed of repeating units of the structure depicted by Formula 1, or such siloxanes can be composed of one or more units depicted by Formula 1 and one or more units depicted by Formula 4.

The siloxane starting materials employed in the instant process contain at least one unit depicted by the formula:

(5) 

wherein R and n are as above defined, and R'''' is a monoolefinically unsaturated hydrocarbon radical containing from 2 to 6 carbon atoms, such as vinyl, allyl, cyclohexenyl and the like. Preferably, the olefinically unsaturated radicals are terminally unsaturated, straight-chain alkenyl radicals. In such case, the siloxane starting materials contain at least one unit depicted by the formula:

(6) 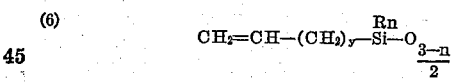

wherein R and n are as above defined, and y is an integer having a value of from 0 to 4, inclusive. Especially preferred as starting materials are those siloxanes in which the alkenyl radicals attached to silicon are vinyl and/or allyl radicals. This is particularly true when the reaction products are to be employed as lubricating oils, since the weight percent of halogen present in the end product has a direct relation to lubricity.

In addition to containing units depicted by Formulas 5 and 6, the siloxane starting materials can also contain one or more units depicted by Formula 4. Thus, the siloxane starting materials employed can be composed of repeating units of the structure depicted by Formula 5, or such siloxanes can be composed of one or more units depicted by Formula 5 and one or more units depicted by Formula 4. Preferably, the starting siloxanes are composed of repeating units of the structure depicted by Formula 6, or are composed of one or more units depicted by Formula 6 and one or more units depicted by Formula 4.

Various siloxane starting materials suitable for use in my invention can be prepared by the addition of hydrolyzable silanes containing a single hydrogen atom bonded directly to silicon, to hydrocarbons containing an acetylenic linkage, to produce hydrolyzable alkenyl silanes, followed by hydrolysis of said silanes to produce cyclic, linear or cross-linked siloxanes (depending upon the number of hydrolyzable groups present). By way of illustration, methylhydrogendichlorosilane can be added to acetylene to produce methylvinyldichlorosilane, which in turn can be hydrolyzed to produce cyclic or linear methylvinylsiloxanes.

Cyclic methylvinylsiloxanes contain at least three, and can contain up to six or more, methylvinylsiloxy units per molecule. High molecular weight linear siloxanes containing methylvinylsiloxy units can be prepared by equilibrating cyclic methylvinylsiloxanes, either alone, or with other cyclic siloxanes, such as the cyclic trimers and tetramers of dimethylsiloxane, methylphenylsiloxane and like compounds. Relatively low molecular weight linear siloxanes containing methylvinylsiloxy units can be prepared by equilibrating cyclic methylvinylsiloxanes with chain end-blocking compounds, such as hexamethyldisiloxane and the like, or with mixtures of such end-blocking compounds and cyclic siloxanes.

Cross-linked siloxanes can be prepared by the hydrolysis and condensation of trifunctional silanes, either alone, or in combination with other hydrolyzable silanes.

Typical siloxane starting materials which can be employed in the process of this invention are tris(trimethylsiloxy) vinylsilane, heptamethylvinylcyclotetrasiloxane and dimethylsiloxane oils containing methylvinylsiloxy units.

The haloforms employed in the process of this invention have the general formula:

(7)  $\qquad HCX_3$ wherein X is a halogen atom, such as fluorine, chlorine or bromine.

The reaction which takes place when the siloxane starting materials are reacted with chloroform in accordance with my invention may be illustrated by the following graphic equation which depicts the reaction between chloroform and my preferred starting siloxanes:

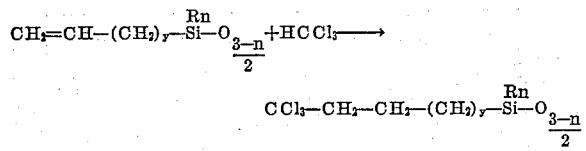

wherein R, $y$ and $n$ are as above defined. Thus may process has been used to prepare compounds such as tris(trimethylsiloxy) - gamma - trichloropropylsilane from chloroform and tris(trimethylsiloxy)-vinylsilane. This may be illustrated by the following graphic equation:

$[(CH_3)_3SiO]_3$—Si—CH=$CH_2$+$HCCl_3$ →
$\qquad [(CH_3)_3SiO]_3$—Si—$CH_2$—$CH_2$—$CCl_3$ When chloroform is replaced by bromoform in the above reaction, the reaction proceeds according to the following graphic equation:

$[(CH_3)_3SiO]_3$—Si—CH=$CH_2$+$HCBr_3$ →
$\qquad [(CH_3)_3SiO]_3$—Si—C(H)(Br)—$CH_2$—C(H)(Br)_2$ Although the relative amounts of reactants employed is not narrowly critical, the reaction is preferably carried out using an excess of haloform in order to prevent cross-linking of the siloxane through the unsaturated radicals. In general, an amount of haloform equal to at least two times the stoichiometric equivalent should be employed for this purpose. In the case of vinylsiloxanes, an amount of haloform equal to 5 times the stoichiometric equivalent has been suitably employed to prevent cross-linking.

The catalysts which may be employed in the process of this invention include ultra-violet light, organic peroxides and azo compounds. Specific examples of organic peroxide catalysts operative herein include ditertiarybutyl peroxide, dibenzoyl peroxide, diacetyl peroxide, dicumyl peroxide, and tertiarybutyl peracetate. Specific examples of azo compounds operative herein include $\alpha,\alpha'$-azodiisobutyronitrile and 2,2'-dicyanoazobenzene.

The concentration of materials employed as catalysts is not narrowly critical, and may vary widely. However, the catalyst is most suitably employed in concentrations of from about 1% to 10%, preferably from about 2% to 8%, by weight of the siloxane employed.

Without wishing to be bound by any one particular theory, it is believed that the reaction proceeds by a free radical mechanism, as the catalysts employed are known catalysts for reactions involving unsaturated organic compounds which proceed by a free-radical mechanism. Thus, the catalysts useful in my process can be termed free radical addition catalysts.

In the practice of the process of this invention, the siloxane starting materials should be substantially free of substituents which inhibit free radical addition reactions. Thus, siloxanes containing such radicals as halogen, alkoxy, carboxyalkyl and the like attached to silicon cannot be employed as starting materials in the instant process.

The term "substantially free" as employed above means that the siloxanes may contain traces of undesirable substituents such as are normally present in commercially available siloxanes. These trace amounts do not interfere with the reaction.

The temperature employed in the process of the instant invention is not narrowly critical, and can vary widely. Thus, temperatures ranging from as low as 50° C. to as high as 180° C. and above can be employed. In general, the more active the catalyst, the lower the temperature required to effect reaction. For example, in the case of an active catalyst, such as dibenzoyl peroxide, temperatures of from 50° C. to 100° C. can be advantageously employed. In the case of a less active catalyst, such as ditertiarybutyl peroxide, temperatures from 100° C. to 180° C., preferably from 130° C. to 150° C., can be effectively employed. Preferably, active catalysts are employed which decompose at temperatures sufficientl low to minimize cross-linking of the siloxane through the unsaturated radicals.

The pressure employed in the process of the instant invention is not critical, and reaction may be effected at any desired pressure. However, when reaction is effected at temperatures above the boiling point of the reactants, it is preferable to carry out the reaction in a closed vessel in order to maintain the reactants in contact.

The novel organo-functional siloxanes prepared in accordance with my invention can be graphically depicted as having molecules containing at least one unit of the formula:

(8) 

wherein R''''' is a trichlorinated or tribrominated saturated hydrocarbon radical containing from 3 to 7 carbon atoms, such as trichloropropyl, tribromopropyl, trichlorbutyl, tribromobutyl, trichloroamyl, tribromoamyl and the like; R is an alkyl radical, such as methyl, ethyl, propyl and the like, or an aryl radical, such as phenyl, naphthyl, tolyl and the like; and $n$ is an integer having a value of from 0 to 2, inclusive.

More specifically, when the haloform employed as starting material is chloroform, the novel organo-functional siloxanes prepared in accordance with my invention can be graphically depicted as having molecules containing at least one unit of the formula:

(9) 

wherein R'' is a divalent saturated hydrocarbon radical containing from 2 to 6 carbon atoms, such as ethylene, propylene, butylene, cyclohexylene and the like; R is an alkyl radical, such as methyl, ethyl, propyl and the like, or an aryl radical, such as phenyl, naphthyl, tolyl and the like; and $n$ is an integer having a value of from 0 to 2, inclusive.

When the haloform employed as starting material is bromoform, the novel organo-functional siloxanes prepared in accordance with my invention can be graphically depicted as having molecules containing at least one unit of the formula:

(10) 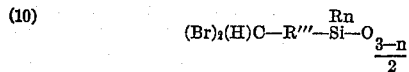

wherein $R'''$ is a mono-brominated divalent saturated hydrocarbon radical containing from 2 to 6 carbon atoms, such as mono-bromo ethylene, mono-bromo propylene, mono-bromo-butylene, mono-bromo cyclohexylene and the like; R is alkyl radical, such as methyl, ethyl, propyl and the like, or an aryl radical, such as phenyl, naphthyl, tolyl and the like; and $n$ is an integer having a value of from 0 to 2, inclusive.

These novel organo-functional siloxanes can also contain one or more hydrocarbon substituted silxane units depicted by the formula:

(11) 

wherein R is an alkyl radical, such as methyl, ethyl, propyl and the like, or an aryl radical, such as phenyl, naphthyl, tolyl and the like, and $a$ is an integer having a value of from 1 to 3, inclusive.

Thus, the novel organo-functional siloxanes which can be prepared in accordance with this invention can be composed of repeating units of the structure depicted by Formula 8, or such siloxanes can be composed of one or more units depicted by Formula 8 and one or more units depicted by Formula 11.

Novel siloxane compounds which have been prepared include tris(trimethylsiloxy) - gamma - trichloropropylsilane, tris(trimethylsiloxy) - alpha - bromo - gamma - dibromopropylsilane, heptamethyl - gamma - trichchloropropylcyclotetrasiloxane, and dimethylsiloxane oils containing gamma-trichloropropylmethylsiloxy units.

The siloxanes prepared in accordance with this invention contain both organo-functional (halogenated hydrocarbon) groups and silicon-functional (Si—O—Si) groups, and undergo the known reactions characteristic of such groups. By way of illustration, the siloxane linkages undergo equilibration reactions, and the halogenated hydrocarbon groups undergo reactions with metal alkoxides to form ethers.

The introduction of halogenated hydrocarbon groups into a siloxane imparts useful properties to the siloxane without impairing the properties normally associated with such compounds, such as thermal and hydrolytic stability. For example, very good lubricating properties are imparted to silicone oils by the introduction of gamma-trichloropropyl groups. Thus, a silicone oil possessing useful lubricating properties can be obtained by converting a dimethylsiloxane oil containing methylvinylsiloxy units by the process of the present invention to a dimethylsiloxane oil containing gamma-trichloropropylmethylsiloxy units. These silicone oils may themselves be used as lubricants, or as additives to base fluids substantially devoid of halogen to improve the lubricating properties of such fluids.

The following examples of my invention are set forth so that those skilled in the art may better understand my invention, and are by way of illustration only, and are not to be construed as limiting my invention in any manner.

EXAMPLE I

*Addition of chloroform to tris(trimethylsiloxy) vinylsilane*

Fifty (50) grams of tris(trimethylsiloxy)vinylsilane (0.166 mole) one hundred (100) grams of chloroform (0.837 mole), and three (3) grams of ditertiarybutyl peroxide (6 percent catalyst of weight of siloxane) were charged to a 300 ml. rocking autoclave. The autoclave was sealed and heated at 135° C. for 5 hours with agitation. Following this, the autoclave was drained, and the reaction mixture fractionated in a short Vigreaux column. Thirty-two and four-tenths (32.4) grams of tris(trimethylsiloxy) - gamma - trichloropropylsilane were recovered (46.4 percent yield). This material had the following properties: B.P. 80–88° C. at 0.2 mm. Hg, $n_D^{25°}$ 1.4238, and was identified by its infra-red absorption spectrum and chemical analysis.

ANALYSIS

| Element | Found, percent | Calculated, percent |
|---|---|---|
| C | 33.7 | 32.7 |
| H | 7.2 | 7.05 |
| Si | 25.4 | 25.4 |
| Cl | 23.6 | 24.1 |

EXAMPLE II

*Addition of bromoform to tris(trimethylsiloxy)vinylsilane*

To a 250 ml. round-bottom flask fitted with a reflux condenser and drying tube were charged 64.4 grams of tris(trimethylsiloxy)vinylsilane (0.213 mole), 288.2 grams of bromoform (1.14 moles), and 3.7 grams of ditertiarybutyl peroxide (5.7 percent catalyst of weight of siloxane). The mixture was heated at its refluxing temperature (141–145° C.) for 5 hours. Excess bromoform was then stripped under reduced pressure. The residue was distilled in a Hickman molecular still and 97.7 grams of tris(trimethylsiloxy) - alpha-bromo-gamma-dibromopropylsilane were collected (82.9 percent yield). This material was identified by its infra-red absorption spectrum and chemical analysis for bromine.

ANALYSIS

| Element | Found, percent | Calculated, percent |
|---|---|---|
| Br | 44.6 | 43.3 |

EXAMPLE III

*Addition of chloroform to heptamethylvinylcyclotetrasiloxane*

Twenty-eight (28) grams of heptamethylvinylcyclotetrasiloxane (0.091 mole), twenty-two (22) grams of octamethylcyclotetrasiloxane, one hundred (100) ml. of chloroform (1.256 moles), and three (3) grams of ditertiarybutyl peroxide (6 percent catalyst of weight of siloxane) were charged to a 300 ml. rocking autoclave. The autoclave was sealed and heated at 135° C. for 5 hours with agitation. Following this, the autoclave was drained, and the reaction mixture fractionated in a short Vigreaux column. Sixteen and seven-tenths (16.7) grams of heptamethyl-gamma-trichloropropylcyclotetrasiloxane ([(CH$_3$)$_2$SiO]$_3$SiO(CH$_3$)(CH$_2$CH$_2$CCl$_3$)) were recovered (42.9 percent yield). This material had a boiling point of 99–121° C. at 1.5 mm. Hg, and was identified by its infra-red absorption spectrum.

EXAMPLE IV

*Addition of chloroform to a dimethylsiloxane oil containing methylvinylsiloxy units*

Fifty (50) grams of dimethylsiloxane oil containing 9.8 weight-percent methylvinylsiloxy units, one hundred (100) grams of chloroform (0.837 mole), and three (3) grams of ditertiarybutyl peroxide (6 percent catalyst of weight of siloxane) were charged to a 300 ml. rocking autoclave. The autoclave was sealed and heated at 135° C. for 5 hours with agitation. Following this, the autoclave was drained, and the reaction mixture stripped of excess chloroform by heating at 135° C. under a pressure of 2 mm. Hg. Forty-three and one-half (43.5) grams of a yellow liquid residue were recovered. Infrared absorption spectrum showed the presence of gamma-trichloropropyl radicals and failed to detect unreacted vinyl groups. Chemical analysis showed a chlorine content of 8.5 percent.

EXAMPLE V

*Addition of chloroform to a dimethylsiloxane oil containing methylvinylsiloxy units*

Sixty (60) grams of a dimethylsiloxane oil containing 30.5 weight-percent methylvinylsiloxy units, 250 ml. of chloroform (3.138 moles), and six (6) grams of dibenzoyl peroxide (10 percent catalyst of weight of siloxane) were charged to a one liter round-bottom flask fitted with a reflux condenser and drying tube. The mixture was heated at its refluxing temperature (78° C.) for 16 hours. Excess chloroform was then stripped under reduced pressure and peroxide residues filtered off. A viscous, slightly yellow liquid residue was recovered. Infra-red absorption spectrum showed the presence of gamma-trichloropropyl radicals and failed to detect unreacted vinyl groups. Chemical analysis showed a chlorine content of 18.5 percent.

What is claimed is:

1. A process for producing a halogenated siloxane consisting of at least one unit of the formula $$(Br)_2(H)C-R'''-Si-O_{\frac{3-n}{2}}^{R_n}$$

wherein R''' is a mono-brominated divalent saturated hydrocarbon radical containing from two to six carbon atoms; R is a member of the group consisting of alkyl and aryl radicals; and n is an integer having a value of from 0 to 2, inclusive; which comprises forming a mixture of bromoform, a siloxane consisting of at least one unit of the formula $$R''''-Si-O_{\frac{3-n}{2}}^{R_n}$$

wherein R and n are as above defined, and R'''' is a monoolefinically unsaturated hydrocarbon radical containing from two to six carbon atoms, and a free radical addition catalyst, and heating the mixture to a temperature sufficiently elevated to cause said bromoform and said siloxane to react to produce said halogenated siloxane.

2. A process for producing a halogenated siloxane consisting of at least one unit of the formula $$(Br)_2(H)C-R'''-Si-O_{\frac{3-n}{2}}^{R_n}$$

and at least one unit of the formula $$R_a-Si-O_{\frac{4-a}{2}}$$

wherein R''' is a mono-brominated divalent saturated hydrocarbon radical containing from 2 to 6 carbon atoms; R is a member of the group consisting of alkyl and aryl radicals; n is an integer having a value of from 0 to 2, inclusive; and a is an integer having a value of from 1 to 3, inclusive, which comprises forming a mixture of bromoform, a siloxane consisting of at least one unit of the formula $$R''''-Si-O_{\frac{3-n}{2}}^{R_n}$$

and at least one unit of the formula $$R_a-Si-O_{\frac{4-a}{2}}$$

wherein R, n and a are as above defined, and R'''' is a monoolefinically unsaturated hydrocarbon radical containing from 2 to 6 carbon atoms, and a free radical addition catalyst, and heating the mixture to a temperature sufficiently elevated to cause said bromoform and said siloxane to react to produce said halogenated siloxane.

3. A process for producing a halogenated siloxane consisting of repeating units of the formula $$(Br)_2(H)C-R'''-Si-O_{\frac{3-n}{2}}^{R_n}$$

wherein R''' is a mono-brominated divalent saturated hydrocarbon radical containing from 2 to 6 carbon atoms; R is a member of the group consisting of alkyl and aryl radicals; and n is an integer having a value of from 0 to 2, inclusive, which comprises forming a mixture of bromoform, a siloxane consisting of repeating units of the formula $$R''''-Si-O_{\frac{3-n}{2}}^{R_n}$$

wherein R and n are as above defined, and R'''' is a monoolefinically unsaturated hydrocarbon radical containing from 2 to 6 carbon atoms, and a free radical addition catalyst, and heating the mixture to a temperature sufficiently elevated to cause said bromoform and said siloxane to react to produce said halogenated siloxane.

4. A process for producing tris(trimethylsiloxy)-alpha-bromo - gamma - dibromopropylsilane which comprises forming a mixture of bromoform, tris(trimethylsiloxy)-vinylsilane, and a free radical addition catalyst, and heating the mixture to a temperature sufficiently elevated to cause said bromoform and said tris(trimethylsiloxy)-vinylsilane to react to produce tris(trimethylsiloxy)-alpha-bromo-gamma-dibromopropylsilane.

5. A process for producing tris(trimethylsiloxy)-alpha-bromo - gamma - dibromopropylsilane which comprises forming a mixture of bromoform, tris(trimethylsiloxy)-vinylsilane, and di-tertiary-butyl peroxide catalyst, and heating the mixture to a temperature sufficiently elevated to cause said bromoform and said tris(trimethylsiloxy)-vinylsilane to react to produce tris(trimethylsiloxy)-alpha-bromo-gamma-dibromopropyl-silane.

References Cited in the file of this patent

UNITED STATES PATENTS

| | | |
|---|---|---|
| 2,715,113 | Gordon | Aug. 9, 1955 |
| 2,851,472 | Bailey et al. | Sept. 9, 1958 |
| 2,860,152 | Fletcher | Nov. 11, 1958 |

OTHER REFERENCES

Tarrant: WADC Technical Report, 55–220 (August 1955), pp. 12 and 37.

Dyckes: WADC Technical Report, 55–220 part III (Sept. 1957), pp. 29–32, 35–38, 48 and 52–53.

Petrov et al.: "Izvest. Akad. Nauk S.S.S.R., Otdel. Khim. Nauk" 1956, pp. 1445–7 (51 Chem. Abstr. 8643 (1957).

Benkeser et al.: "Jour. Am. Chem. Soc.," vol. 79 (1957), pages 6253–6.